UNITED STATES PATENT OFFICE.

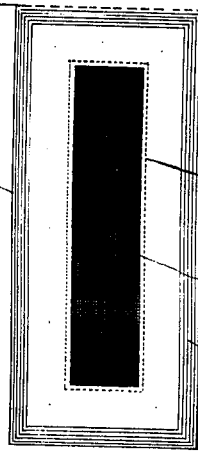

JOHN F. McQUEENY, OF KANSAS CITY, MISSOURI.

TRAVELER'S CHECK.

1,307,560.   Specification of Letters Patent.   Patented June 24, 1919.

Application filed July 17, 1916. Serial No. 109,813.

*To all whom it may concern:*

Be it known that I, JOHN F. McQUEENY, a citizen of the United States, residing at Kansas City, in the county of Jackson and State of Missouri, have invented certain new and useful Improvements in Travelers' Checks, of which the following is a specification.

This invention relates to travelers' checks and my object is to produce a check or the like, for the use of travelers or in transactions where payment is to be made on demand and the payee can only be identified ordinarily by his signature.
More specifically my object is to produce a check or the like containing a concealed signature of the person to whom the check is made payable and a space wherein the payee shall be required to sign his name at the bank or other institution where the check is presented for payment so that the official or clerk may uncover the concealed signature and compare it with the other signature to determine whether or not the check shall be honored.

Another object is to produce a check of the character outlined having means for rendering opaque that portion of the check containing the concealed signature so that it shall be impossible for a person to determine what the concealed name is without mutilating or tampering with the check or seal and thereby giving grounds upon which payment may be refused.
With these objects in view the invention consists primarily in the provision of a check or the like containing the signature of the payee and means for concealing such signature in such a manner that it can not be deciphered without mutilation of the seal or check, and in order that the invention may be fully understood reference is to be had to the accompanying drawing, in which—

Figure 1, is a face view of a check embodying my invention, prior to the concealment of the signature of the payee.

Fig. 2, is a similar view of the check with the signature concealed and ready to receive a duplicate signature by the payee at the bank or other institution where the check is presented for payment.

Fig. 3, is a bottom edge view of the completed check as shown in Fig. 2.

Fig. 4, is a similar view of a modified form of the check.

In the said drawing, 1 indicates a check containing in addition to the customary written or printed matter, two places for the signature of the payee, and a statement to the effect that if the sealing element, hereinafter mentioned, is mutilated the check will be honored only at the bank or place where it was purchased. The check is also provided with a sealing flap 2, which is indicated in Figs. 1 to 3 inclusive, as of integral construction with the body of the check, but which may be applied thereto after issuance of the check to the purchaser, as hereinafter explained.

The flap 2 contains adhesive on its inner side around its margin as indicated by the shade lines 3, so that when the flap is folded over the body of the check so as to cover and conceal the signature thereon of the purchaser, it will retain its position. The flap is also provided with an opaque or equivalent panel 4, by blackening its inner surface, or otherwise, which panel when the flap is fastened to the body of the check shall cover the purchaser's signature thereon and thereby make it impossible for a person to decipher the name and the peculiarities of the signature. The flap will preferably be weakened by a line of perforations 5 extending completely around the panel inside the gummed margins so that an official of the institution from which payment is demanded may readily tear out that portion of the label inclosed by the perforated lines, for the purpose of exposing the concealed signature.

After the flap is fastened down upon the body of the check, the issuing bank or institution will apply an embossing seal, or the like, to the check and flap, the embossing preferably being of such character as to emboss the check and seal completely around the concealed signature of the check, as indicated at 6, though it will be understood that the special character of embossment is unimportant, as it is employed simply to make it more difficult for a person to obtain access to the signature without mutilation of the flap. It will of course be understood that the bank or institution which pays the check need exercise no care in the removal of the flap beyond that necessary to expose the concealed signature for comparative purposes.

When the check is presented for payment the holder will be required to sign it at the place provided for the second signature, and then the official of the institution upon which the demand for payment is made, will tear off the flap and thus expose the concealed signature to satisfy himself that the signatures correspond and that the person demanding payment was the purchaser of the check from the issuing institution.

In Fig. 4, the sealing flap 2 comprises a folded strip of paper fitted around one edge of the check and secured to the same at both sides. With the proper kind of paper, the signature may be concealed without the provision of a specially prepared opaque panel, that is to say the color of the check or the concealing flap may be such as to make it impossible for a person to decipher the name under said flap, after once being caused to adhere to the body of the check and embossed with a seal, it can not be withdrawn without mutilation.

It will be understood of course that the places for the duplicate signatures of the purchaser may be on the back or face of the check or at opposite sides thereof, though to facilitate comparison by the proper official of the institution to which the check is presented for payment, it is preferable to have the two signatures appear on the same side of the check.

It will be understood that while I have illustrated the preferred embodiments of the invention, I reserve the right to all changes which properly fall within the spirit and scope of the appended claim.

I claim:

A traveler's check containing the customary data on its face and a place in the lower right hand corner for the payee's signature when the check is presented for payment and a place in the lower left hand corner for the payee's signature when the check is issued to him, said check also having a foldable extension at its lower left hand corner adapted to be folded over the payee's signature, said extension having an opaque panel to cover said signature so that it cannot be deciphered by holding the check up to the light, and having a gummed surface inclosing said panel and adapted when moistened and folded down upon the face of the check to adhere to the same around the said signature.

In testimony whereof, I affix my signature, in the presence of two witnesses.

JOHN F. McQUEENY.

Witnesses:
  H. C. RODGERS,
  G. Y. THORPE.